April 4, 1939.  E. L. BEECHER  2,152,859
SHOCK ABSORBER
Filed Sept. 11, 1935  2 Sheets-Sheet 1
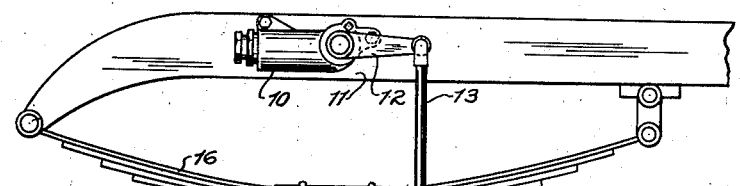
Fig. 1
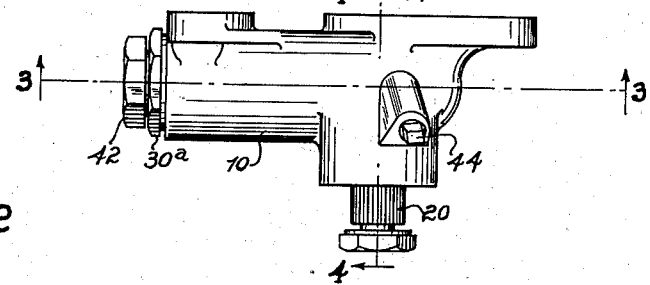
Fig. 2
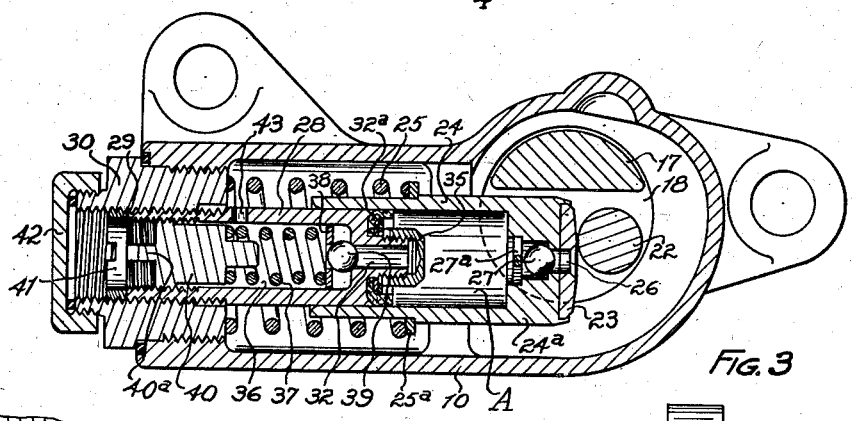
Fig. 3
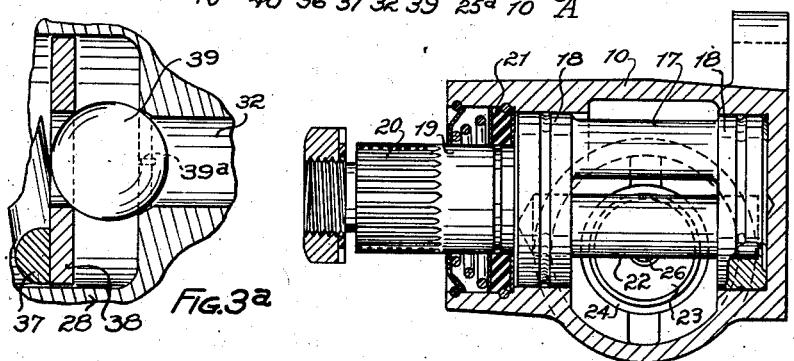
Fig. 3ª  Fig. 4
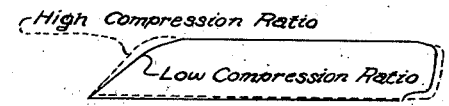
Fig. 5
INVENTOR.
BY EUGENE L. BEECHER
Kwis, Hudson & Kent
ATTORNEYS.

April 4, 1939.  E. L. BEECHER  2,152,859
SHOCK ABSORBER
Filed Sept. 11, 1935    2 Sheets-Sheet 2
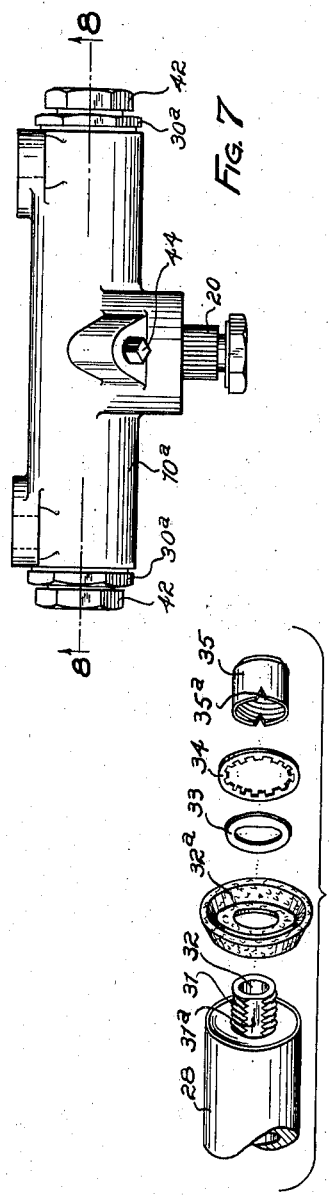
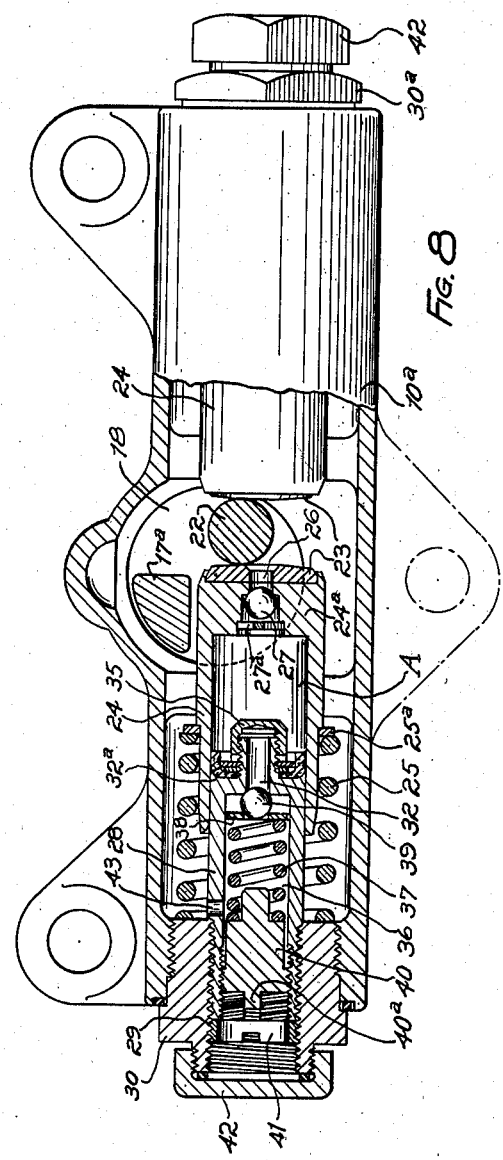
INVENTOR.
EUGENE L. BEECHER
BY Kwis, Hudson & Kent.
ATTORNEYS Patented Apr. 4, 1939

2,152,859

UNITED STATES PATENT OFFICE 2,152,859

SHOCK ABSORBER

Eugene L. Beecher, Cleveland Heights, Ohio, assignor to The Gabriel Company, Cleveland, Ohio, a corporation of Ohio Application September 11, 1935, Serial No. 40,141

10 Claims. (Cl. 267—8)

This invention relates to a shock absorber and particularly to a hydraulic shock absorber of the piston and cylinder type especially adaptable for use upon motor vehicles.

The broad object of the invention is to provide a hydraulic shock absorber of the piston and cylinder type which is so constructed that its functional characteristics can be varied to suit the requirements of different installations so as to provide the most desirable riding qualities.

Another broad object of the invention is to provide a construction for a hydraulic shock absorber of the piston and cylinder type such that a set of master shock absorbers having provision for adjusting the relationship of the piston to the cylinder to vary the ratio of initial volume to final volume of the compression chamber and also having provision for adjusting the tension of the pressure relief spring can be employed to determine the compression ratio and pressure relief adjustment desirable in production shock absorbers for different installations.

Another object of the invention is to provide in a hydraulic shock absorber of the piston and cylinder type and initial variable tapering resistance by varying the ratio of the initial volume to the final volume of the compression chamber.

A further object is to provide in a hydraulic shock absorber of the piston and cylinder type an initial variable tapering resistance by means of an external manual adjustment of the ratio of the initial volume to the final volume of the compression chamber.

A more specific object is to provide in a hydraulic shock absorber of the piston and cylinder type an external pressure relief adjustment which is independent of the adjustments of the ratio of the initial volume to the final volume of the compression chamber.

Another specific object is to provide in a hydraulic shock absorber of the piston and cylinder type a single dust cap for both the pressure relief adjusting means and the adjusting means for the initial and final volume of the compression chamber.

A further object is to provide in a hydraulic shock absorber means for efficiently scavenging the air accumulated in the oil or other liquid used in the shock absorber.

A still further object is to provide a hydraulic shock absorber of the piston and cylinder type which is substantially noiseless in operation.

A further object is to provide in a hydraulic shock absorber of the piston and cylinder type means for scavenging the air accumulated in the liquid used in the shock absorber together with means for noiselessly by-passing the liquid in the hydraulic circuit.

Further and additional objects and advantages not hereinbefore set forth will appear hereinafter during the detailed description of the two embodiments of the invention which will be specifically described and which are illustrated in the accompanying drawings, wherein Fig. 1 is a fragmentary side view of a vehicle chassis having a shock absorber embodying the present invention applied thereto.

Fig. 2 is a top plan view of the shock absorber shown in Fig. 1, the lever arm being omitted.

Fig. 3 is a sectional view on a larger scale than Fig. 2 and is taken substantially on line 3—3 of Fig. 2, looking in the direction of the arrows.

Fig. 3a is an enlarged fragmentary sectional view of the portion of the fixed piston containing the pressure relief valve.

Fig. 4 is a sectional view taken substantially on line 4—4 of Fig. 2 looking in the direction of the arrows.

Fig. 5 is a graphic illustration of the variable functional characteristics attained in the shock absorber illustrated in the previous views when high and low compression ratios are employed in the shock absorber.

Fig. 6 is an elevational view of a part of the fixed piston of the shock absorber and certain elements which are associated therewith, said piston and said elements being shown in separated relationship.

Fig. 7 is a top plan view of a shock absorber which differs from the shock absorber shown in Fig. 2 in that it is a double acting shock absorber, whereas that shown in Fig. 2 is a single acting one, and Fig. 8 is a view partly in section and partly in elevation on a larger scale than Fig. 7, the section being taken substantially on line 8—8 of Fig. 7 looking in the direction of the arrows.

Referring to Fig. 1 the shock absorber housing 10 is secured in a well known manner to the side of the vehicle frame member 11. A lever 12 is operatively connected at one end to the outwardly projecting end of the operating crank shaft of the shock absorber and which will later be referred to, while the opposite end of the lever 12 is swively connected to the upper end of a link 13, the lower end of which is swively connected to a bracket 14 anchored to the vehicle axle 15 by suitable clamping means.

It will be understood that when the vehicle wheels, not shown, strike an obstruction in the roadway, the axle 15 will move upwardly under the impact and cause a compression or upward movement of the vehicle springs 16 and also an upward movement of the link 13 and a rocking movement of the lever 12 in an anti-clockwise direction in Fig. 1. Following such upward movement of the axle 15 and consequent compression of the springs 16, there will be a downward movement of the axle and a recoil expansion of the springs 16, resulting in a downward movement of the link 13 and a rocking movement of the lever 12 in a direction opposite to that first mentioned. The description so far given is well understood in the art and further reference to the manner in which the shock absorber is mounted on the vehicle and the broad functioning of the same are unnecessary.

The housing 10 of the shock absorber constitutes a low pressure reservoir for the oil or liquid and is provided adjacent one end with a cylindrical portion in which is mounted the operating or crank-shaft 17 of the shock absorber, such shaft having cylindrical portions 18 arranged in suitable bearings in the housing and a reduced cylindrical portion 19 concentric with the portions 18 and which extends outwardly of the housing at the front side thereof and is provided with suitable longitudinal serrations 20, by means of which the lever 12 is operatively interlocked with the shaft as will be well understood in the art. The portion 19 of the crank-shaft 17 passes through a spring tensioned packing 21 which forms a liquid-tight seal and which is well known. Disposed eccentrically between the portions 18 of the crank-shaft is a hardened crank-shaft pin 22 which bears against a hardened insert 23 fixed in the end of a movable cylinder 24 mounted in the housing 10 and disposed transversely with respect to the axis of the crank-shaft.

It will be understood that when the lever 12 and the crank-shaft 17 are rocked in a clockwise direction, as viewed in the drawings, the crank-shaft pin 22 will move the cylinder 24 against the action of the heavy cylinder spring 25 which surrounds the cylinder and abuts a ring 25a thereon, and that when the lever and crank-shaft are rocked in the opposite or anti-clockwise direction the spring 25 will move the cylinder 24 in the opposite direction from that previously referred to and maintain the insert 23 thereof in contact with the crank-shaft pin 22.

The closed end 24a of the cylinder and the insert or cylinder head 23 are provided with a bore 26 extending therethrough, a portion of which is enlarged to receive a ball check valve 27 retained in position in the enlarged portion of the bore 26 by a retainer 27a, whereby said ball check valve will seat and close the bore 26 when the cylinder is moving inwardly against the action of the spring 25, and when the cylinder is moving in the opposite direction the ball check valve will unseat and the bore 26 will be open for the passage of liquid therethrough from the housing reservoir 10 and into the interior of the cylinder.

The cylinder 24 has a close working fit upon the exterior of a fixed piston 28, which piston has an externally threaded end that can be adjustably screwed inwardly and outwardly of a threaded bore 29 located in the piston base 30, which, in turn, is externally threaded so as to be screwed into and seal the opening in the housing 10, said base being provided with a suitable hexagonal wrenching surface 30a exteriorly of the housing to facilitate its insertion and removal therefrom.

The inner and closed end of the piston 28 is provided with a centrally disposed threaded extension 31, (see Fig. 6) and with a longitudinal bore 32 extending centrally through said closed end and the extension 31. The closed end of the piston 28 adjacent the extension 31 is slightly countersunk and receives a cup packing 32a which fits over the extension 31 and has its sides tightly engaging the bore of the interior wall of the cylinder 24. A washer 33 fits upon the extension 31 and is located within the cup packing 32a, it being noted that the opening through said washer is provided with a straight sided portion corresponding to a longitudinally extended flat 31a formed on the threaded extension 31. A lock washer 34 for the cup packing 32a is also arranged on the extension 31, said washer having spring toothed portions extending into the opening therein and which bear against the inner end of the screw or piston cap 35 which is screwed down upon the extension 31 to firmly clamp the cup packing 32a, washer 33 and lock washer 34 in position, it being noted that the inner end of the cap 35 is provided with a pair of diametrically disposed V-shaped notches 35a for a purpose later to be referred to.

The bore 32 through the closed end of the piston 28 and the extension 31 thereof communicates with an enlarged counterbore or chamber 36 in the piston and in which is located a pressure relief spring 37 bearing at one end against a washer 38 having a small working clearance in the counterbore, and acting as a retainer for the pressure relief ball check valve 39 located between the washer and the closed end of the piston and tending to normally substantially seal the bore 32 through said closed end. As clearly shown in Fig. 3a the tapered end of the bore 32 against which the ball 39 seats is provided with a small longitudinally extending notch 39a for a purpose later to be explained. The opposite end of the spring 37 abuts with an adjustable screw plug 40 threaded into a threaded portion of the counterbore 36 in the piston. The outer or left hand end of the adjusting screw plug 40, as viewed in the drawings, is provided with a projection 40a, which can be engaged to adjust said screw to vary the tension on the spring 37, it being understood that access to the screw is obtained exteriorly of the housing through the threaded bore 29 in the piston base 30. It will likewise be remembered that the piston 28 can be adjusted from exteriorly of the housing through the bore 29 in the member 30, it being noted that the end of the piston is provided with suitable recesses for receiving a spanner wrench for this purpose. A piston locking ring 41 is screwed into the bore 29 for retaining the piston in the properly adjusted position, and said ring is also provided with means for receiving a spanner wrench. A suitable dust cap 42 is secured upon a threaded extension of the base member 30 and closes the bore 29 therethrough, it being noted that when this cap is removed access can be had both for the purpose of adjusting the screw 40 to vary the tension on the pressure relief spring 37 and also for the purpose of adjusting the position of the piston 28 for a reason later to be explained.

The piston 28 is provided with an orifice 43 communicating with the counterbore 36 and with the interior of the reservoir housing 10. It will be noted that the piston 28, cylinder 24, base 30 and their associated parts constitute what may be termed a "cartridge" which can be moved from or inserted into the housing 10 as a unit without affecting or requiring the removal of the crankshaft 17.

It will be understood that the housing 10 is filled with a suitable liquid, such as oil, through an opening which can be closed by a filler plug 44, (see Fig. 2). As the axle 15 and link 13 move upwardly upon impact of the vehicle wheels with an obstruction in the road, the shaft 12 is rocked in a direction such that the pin 22 moves away from the cylinder 24, but that under the action of the spring 25 the cylinder and the insert 23 will follow and remain in contact with the pin and during this movement of the cylinder the ball check valve 27 will be unseated and the liquid within the housing 10 will flow through the bore 26 and into the chamber A formed in the cylinder between the closed end thereof and the end of the piston. Upon the recoil of the vehicle springs 16 which were compressed by the impact movement just referred to, the lever 12 moves in the opposite direction, whereupon the crank-shaft pin 22 moves the cylinder 24 against the action of the spring 25 and against the action of the liquid drawn into the compression chamber A as explained above.

As previously stated a hydraulic shock absorber embodying the present invention is so constructed that its functional characteristics can be varied to meet the requirements incident to different installations. This variation in the functional characteristics of the shock absorber is accomplished by the provision of means for varying the ratio of the initial volume to the final volume of the compression chamber A to furnish an initial variable tapering resistance.

Inasmuch as the piston 28 is threadedly connected to the base 30 it can be adjusted relatively to the cylinder 24 from exteriorly of the housing 10 through the bore 29 when the cap 42 is removed to vary the ratio of the initial volume to final volume of the compression chamber A and to thus effect a corresponding variation in the compression ratio. In order to effect a high ratio between initial volume and final volume and a high compression ratio the piston 28 is adjusted inwardly of the cylinder 24 to reduce the initial volume of the chamber A and conversely the piston is adjusted in the opposite direction to increase the initial volume of the chamber A to lower the compression ratio.

Assuming a known speed, lever length, stroke and pressure relief valve setting, a certain number of degrees movement of the lever arm will have taken place when the link force measured dynamically at the end of the lever arm reaches the beginning of its maximum. In reducing the present invention to practice it has been found that if the compression ratio is changed by varying the ratio of initial volume to final volume, all other factors remaining constant, the degrees movement of the lever arm before the link force measured dynamically at the end of the lever arm reaches the beginning of maximum will also change. The higher the compression ratio the less will be the degrees movement of the lever arm and, conversely, the lower the compression ratio the greater the degrees movement of the lever arm. The initial travel of the lever arm before maximum resistance force commences can be increased from zero to maximum by adjustably lowering the compression ratio by adjusting the piston 28 to increase the ratio of initial volume to final volume of the compression chamber A. The advantage of varying the amount of initial travel of the lever arm before maximum resistance force commences will be readily apparent, since on certain car installations the car springs are of such character as to require a large amount of initial travel of the lever arm while on other installations the amount of initial travel should be much less.

Assuming that piston 28, as shown in Fig. 3, is adjusted for a high ratio of initial volume to final volume of the chamber A with a consequent high compression ratio, the initial travel of the lever arm before maximum resistance force commences will be relatively small, as indicated by the dash line curve in Fig. 5. The first small portion of the upward dash line curve represents the "take-up" as the cylinder 24 commences its movement toward the piston, that is, the movement of the cylinder which occurs before the cup packing 32a has been forced into tight engagement with the wall of the cylinder and the spring of the metal of the parts absorbed. The remainder of the upward curve represents the further inward movement of the cylinder which forces the liquid from the chamber A through the port formed by the flat 31a into the bore 32 until the ball valve 39 has been completely unseated and the spring 37 compressed to its maximum resistance. The liquid during the first part of this further movement of the cylinder passes from the bore 32 into counterbore 36 through the small groove 39a and the passage of the liquid in this manner is analogous to leakage. As soon as the pressure in the bore 32 reaches a predetermined amount the ball valve 39 moves away from its seat until the spring 37 is fully compressed to its maximum resistance, wherefore the movement of the cylinder is against maximum resistance. The liquid passing from chamber A into the counterbore or expansion chamber 36 goes through the port 43 into the reservoir housing 10.

When a particular installation requires a relatively large amount of initial movement of the lever arm before maximum resistance force commences the piston 28, as previously stated, will be adjusted so as to increase the initial volume of the chamber A to thus change the ratio of initial volume to final volume and to lower the compression ratio. As already stated, it has been found that the lower the compression ratio the greater will be the initial movement of the lever arm before maximum resistance force commences. The full line curve in Fig. 5 represents the movement of the lever arm when the piston 28 has been adjusted for a low compression ratio, and it will be noted that said curve tapers gradually upward before maximum resistance is reached, whereas in the dash line curve representing the high compression ratio the upward curve is more abrupt and approaches more nearly to the vertical.

As previously stated, it has been found in actual practice that changing the ratio of initial volume to final volume by adjusting the piston 28 to vary the compression ratio, all other factors remaining constant, actually results in changing the functional characteristics of the shock absorber to the extent that the greater the compression ratio the less will be the initial movement of the lever arm before maximum resistance force commences, and that by lessening the compression ratio the initial movement of the lever arm can be increased from zero to maximum. In view of the fact that the speed, lever length, stroke and pressure relief valve setting remain constant for the various adjustments of the ratio of initial volume to final volume and that liquid is substantially non-compressible, it is believed that the variable factor which explains the variation in the functional characteristics is the leakage provided by the groove 39a.

As previously stated, an object of the invention is to provide means for scavenging the air accumulated in the liquid, and particularly such means in combination with a noiseless fluid by-pass in the hydraulic circuit. The passage provided from the lowermost portion of the cup packing 32a into the bore 32 by the flat 31a on the extension 31 constitutes a fixed low resistance choke, while the bore 32 may be said to be an intermediate expansion chamber between the compression chamber A and the counterbore 36, with the latter acting as a second expansion chamber. When the cylinder 24 is moved toward the piston 28 any entrained bubbles of air will pass from the base of the cup packing 32a through the fixed low resistance choke formed by the flat 31a and into the bore or first intermediate expansion chamber 32, from whence it can pass into the counterbore or second expansion chamber 36 through the groove 39a, or when sufficient pressure has been built up to unseat the ball valve 39 the air will, of course, pass directly from the bore 32 around the ball 39 and into the counterbore 36.

It will be recalled that the piston 28 is provided with a port 43 placing the counterbore 36 in communication with the interior of the housing or reservoir 10, which interior can be called an atmospheric pressure chamber, while the port 43 can be termed a second low resistance choke. The air which has passed into the counterbore 36 passes through the port or choke 43 into the atmosphere pressure chamber formed in the housing. Inasmuch as the entrained air can escape from the base of the cup packing 32a and into the bore 32, it will be seen that the liquid or oil in the compression chamber A will first have the air excluded therefrom upon the start of the compression stroke, and that after several strokes of the cylinder the air in the liquid will have passed to the upper portion of the housing 10 above the liquid.

In order to provide for a relatively noiseless flow of fluid through the piston and into the housing reservoir the choke orifices should be proportioned so that the choke formed by the port 43 is of less value than the choke formed by the flat 31a on the extension 31, while the second expansion chamber formed by the counterbore 36 should be larger than the first expansion chamber formed by the bore 32. The movement of the ball valve 39 to and from its seat will be substantially noiseless, inasmuch as the bore 32 and the orifice formed by the flat 31a, form a dashpot with the ball valve 39 acting against the liquid therein in moving to seated position, wherefore such movement of the ball valve is effectively slowed or dampened. It should also be noted that the natural periodicity of the pressure relief valve spring 37 is dampened, with a consequent elimination of noise in the shock absorber, due to the dashpot effect of the washer 38, which has a working fit in the counterbore 36, acting against the liquid in the counterbore when moving in one direction, while its movement in the opposite direction is resisted through the ball valve 39 by the dashpot action taking place in the bore 32.

It will further be noted that the screw plug 40 can be adjusted from exteriorly of the housing without disturbing the adjustment of the piston relative to the cylinder, and that access to this plug as well as access to the piston for purposes of adjusting the same, is had through a common opening in the base 30, which opening is normally closed by the single dust cap 42.

In Figs. 7 and 8 there is illustrated a shock absorber identical with that previously shown and described, with the exception that the housing 10a is provided with diametrically opposed cylindrical portions arranged transversely to the operating crank-shaft 17a, and in each of which portion is secured a removable cartridge unit formed of the fixed piston and movable cylinder previously described, each of said cylinders engaging and being actuated by the eccentrically disposed pin 22a as will be well understood.

Aside from the fact that the shock absorber shown in Figs. 7 and 8 is of the double acting type, the construction and operation of the same is identical with that previously disclosed, and accordingly the same reference characters are employed to designate the various parts of the shock absorber.

Although it is within the contemplation of the present invention to construct production shock absorbers with the adjustability between the relationship of the piston and cylinder to vary the ratio of initial volume to final volume of the compression chamber, as well as to include therein the provision of pressure relief adjustment, the present intention is to construct a set of master shock absorbers embodying the adjustable feature specified and then to mount these master shock absorbers upon a certain installation to determine the correct ratio of initial volume to final volume of the compression chamber and the correct pressure relief setting for the installation.

The determination of the ratio of initial volume to final volume of the compression chamber and the pressure relief setting most desirable for the installation having been effected, with the master shock absorbers, the production shock absorbers for that installation may then be constructed with the predetermined ratio of initial volume to final volume of the compression chamber and with the predetermined pressure relief setting, said production shock absorbers, however, not being provided with means for varying these adjustments. This would provide an efficient and economical method of constructing the production shock absorbers and would eliminate the additional costs incident to providing said production shock absorbers with the adjustable features, while at the same time it would assure for each installation shock absorbers having functional characteristics best suited for the particular needs of that installation to provide the most desirable riding qualities therefor.

While a preferred embodiment of the invention has been illustrated and described herein, it should be understood that the invention is not to be limited thereto but is susceptible of various modifications and adaptations within the scope of the appended claims.

Having thus described my invention, I claim:

1. In a hydraulic shock absorber of the piston and cylinder type, a housing, a piston member, a cylinder member, means for mounting said members in said housing, means independent of said first named means for adjusting the relationship between the piston member and cylinder member and acting independently of any relative operative movement between said members to vary the ratio of initial volume to final volume of the compression chamber, and actuating means in constant engagement with one of said members and adapted to produce relative movement between said members.

2. In a hydraulic shock absorber, a housing, a piston member and a cylinder member, means for mounting said members in said housing, means independent of said first named means operable from the exterior of the housing and acting independently of any relative operative movement between said members for adjusting the relationship between the piston and cylinder to vary the ratio of initial volume to final volume of the compression chamber, and actuating means in constant engagement with one of said members and adapted to produce relative movement therebetween.

3. In a hydraulic shock absorber, a housing, a piston member and a cylinder member, means for mounting said members in said housing, one of said members being fixed and the other movable, means independent of said first named means for relatively adjusting said members from the exterior of the housing and acting independently of any relative operative movement between said members to change the relationship therebetween to vary the ratio of initial volume to final volume of the compression chamber, and actuating means in constant engagement with the movable member and adapted to produce relative movement between the members.

4. In a hydraulic shock absorber, a housing having an opening therein, a removable base member mounted in said opening and provided with a threaded recess, a fixed piston provided with an exteriorly threaded end portion adapted to be adjustably screwed into said threaded recess, and a movable cylinder operating on said piston.

5. In a hydraulic shock absorber, a housing having an opening therein and a cartridge unit insertible into and removable from said housing through said opening and comprising relatively movable piston and cylinder members, and a base member detachably mounted in said opening, said base member and one of said first named members having cooperating portions for adjustably connecting the latter member to the base member whereby the relationship between the piston and cylinder members can be changed to vary the ratio of initial volume to final volume.

6. In a hydraulic shock absorber, a housing, relatively movable piston and cylinder members, means for mounting said members in said housing, means independent of said first named means for adjusting the relationship between the piston and cylinder members and acting independently of any relative operative movement between said members to vary the ratio of initial volume to final volume of the compression chamber, means for allowing leakage from the compression chamber into an expansion chamber during the compression stroke, and actuating means in constant engagement with one of said members and adapted to produce relative movement therebetween.

7. In a hydraulic shock absorber, a housing having an opening, a mounting member secured in said opening, relatively movable piston and cylinder members in said housing, one of said relatively movable members being adjustably secured to said mounting member, a pressure relief valve carried by one of said relatively movable members and including a valve spring, and means for adjusting said valve spring, said adjustable member and said valve spring adjusting means being accessible from exteriorly of the housing for independent adjustment.

8. In a hydraulic shock absorber, a housing having a threaded opening therein, a threaded base member screwed into said opening and provided with a threaded bore therethrough, a piston having an exteriorly threaded end screwed into said threaded bore and provided with a counterbore therein which is threaded adjacent its end, a movable cylinder working on said piston, means forming a passage from the interior of said cylinder to the counterbore in said piston, a valve for closing said passage, a spring for resisting movement of said valve arranged in the counterbore in said piston, and an adjustable screw-threaded plug against which said spring abuts screwed into the threaded portion of said counterbore, said plug being adjustable from the exterior of the housing through the bore in said base member to vary the tension of the spring and said piston being similarly adjustable to change the relationship between it and the cylinder to vary the ratio of initial volume to final volume.

9. In a hydraulic shock absorber, a housing having a threaded opening therein, a threaded base member screwed into said opening and provided with a threaded bore therethrough, a piston having an exteriorly threaded end screwed into said threaded bore and provided with a counterbore therein which is threaded adjacent its end, a movable cylinder working on said piston, means forming a passage from the interior of said cylinder to the counterbore in said piston, a valve for closing said passage, a spring for resisting movement of said valve arranged in the counterbore in said piston, an adjustable screw-threaded plug screwed into the threaded counterbore and against which said spring abuts, said plug being adjustable from the exterior of the housing through the bore in said base member and said piston being similarly but independently adjustable, and a closure for the outer end of the bore through said base member.

10. In a hydrulic shock absorber, a housing, a cylinder, a hollow piston having a closed end working in said cylinder and provided with a reduced extension having a longitudinally extending flat and with a bore extending through it and through said extension, a cup packing on said extension with its base adjacent the inner end of said flat, a cap on said extension, a pressure relief valve in said piston acting to seal said bore, and a port in said piston placing the interior thereof in communication with said housing, said cap and the flat on said extension forming a passage from the extreme end of the compression chamber into the bore whereby upon commencement of the compression stroke air entrained in the liquid first will be forced into said bore.

EUGENE L. BEECHER.